United States Patent
Jiang (10) Patent No.: US 7,646,791 B2
(45) Date of Patent: Jan. 12, 2010

(54) METHOD AND APPARATUS OF DATA SEGMENTATION IN A MOBILE COMMUNICATIONS SYSTEM

(75) Inventor: Sam Shiaw-Shiang Jiang, Taipei (TW)

(73) Assignee: Innovative Sonic Limited, Tortola (VG)

( * ) Notice: Subject to any disclaimer, the term of this patent is extended or adjusted under 35 U.S.C. 154(b) by 497 days.

(21) Appl. No.: 11/383,759

(22) Filed: May 17, 2006

(65) Prior Publication Data

US 2006/0262811 A1    Nov. 23, 2006

Related U.S. Application Data (60) Provisional application No. 60/594,921, filed on May 18, 2005.

(51) Int. Cl.
  *H04J 3/24* (2006.01)
(52) U.S. Cl. ...................... 370/474; 370/465
(58) Field of Classification Search ............. None
  See application file for complete search history.

(56) References Cited

U.S. PATENT DOCUMENTS

| | | | |
|---|---|---|---|
| 5,570,362 A | 10/1996 | Nishimura | |
| 6,947,394 B1* | 9/2005 | Johansson et al. | 370/282 |
| 7,359,403 B1* | 4/2008 | Rinne | 370/469 |
| 7,391,758 B2* | 6/2008 | Matusz | 370/349 |
| 7,460,473 B1* | 12/2008 | Kodama et al. | 370/230 |
| 2002/0048281 A1* | 4/2002 | Yi et al. | 370/474 |
| 2006/0187964 A1* | 8/2006 | Li et al. | 370/474 |
| 2008/0144556 A1* | 6/2008 | Rinne | 370/310 |

FOREIGN PATENT DOCUMENTS

| | | |
|---|---|---|
| CN | 1339903 A | 3/2002 |
| DE | 699 16 870 T2 | 3/2005 |
| KR | 10-2004-0011692 | 2/2004 |
| TW | 508949 | 11/2002 |

OTHER PUBLICATIONS

3GPP TS 25.322 V6.3.0 (Mar. 2005), "Radio Link cotnrol (RLC) Protocol Specification (Release 6)".
R2-051311, "Segmentation and Concatenation for VoIMS", Samsung, 3GPP TSG-RAN2 Meeting #47, Athens, Greece May 9-13, 2005.
"RLC L1 Optimization for Vo1Ph", 3GPP RAN2 email exploder for email approval submitted from Samsung on May 16, 2005.
Comment on [3] by LGE In the 3GPP RAN2 email exploder on May 17, 2005.

* cited by examiner

*Primary Examiner*—Phirin Sam
(74) *Attorney, Agent, or Firm*—Winston Hsu (57) ABSTRACT

A method of data segmentation in a transmitter of a mobile communications system includes initiating alternate extension bit interpretation, a last data segment of a Service Data Unit exactly ending at an end of a Protocol Data Unit, no Length Indicator in the Protocol Data Unit indicating the end of the Service Data Unit, a length of a next Service Data Unit following the Service Data Unit exactly equaling to a length of a data field of a next Protocol Data Unit following the Protocol Data Unit, and setting a first extension bit of the next Protocol Data Unit to be a specified value for indicating that the next Protocol Data Unit comprises a complete Service Data Unit, which is not segmented, concatenated or padded, and indicating that a Service Data Unit exactly ended in the Protocol Data Unit.

9 Claims, 8 Drawing Sheets

METHOD AND APPARATUS OF DATA SEGMENTATION IN A MOBILE COMMUNICATIONS SYSTEM

CROSS REFERENCE TO RELATED APPLICATIONS

This application claims the benefit of U.S. Provisional Application No. 60/594,921, filed May 18, 2005, and included herein by reference.

BACKGROUND OF THE INVENTION

1. Field of the Invention

The present invention is a method of data segmentation in a mobile communications system, in particular a method that sets a flag in a Protocol Data Unit to be a specified value to increase transmission efficiency and avoid wasting of system resources.

2. Description of the Prior Art

As defined by the $3^{rd}$ Generation Partnership Project (3GPP), the Radio Link Control entity comprises three transmission modes. The three transmission modes, Transparent Mode (TM), Unacknowledged Mode (UM), and Acknowledged Mode (AM), are for different quality requirements to segment packets. In UM, apart from segmenting packets, an appropriate header is added for each packet to aid checking packet order at a receiver and discarding error packets. This is suitable for services that have requirements of both instant transmission and packet order, such as Voice over Internet Protocol (VoIP) communications, Video Phone etc.

Figure 1:
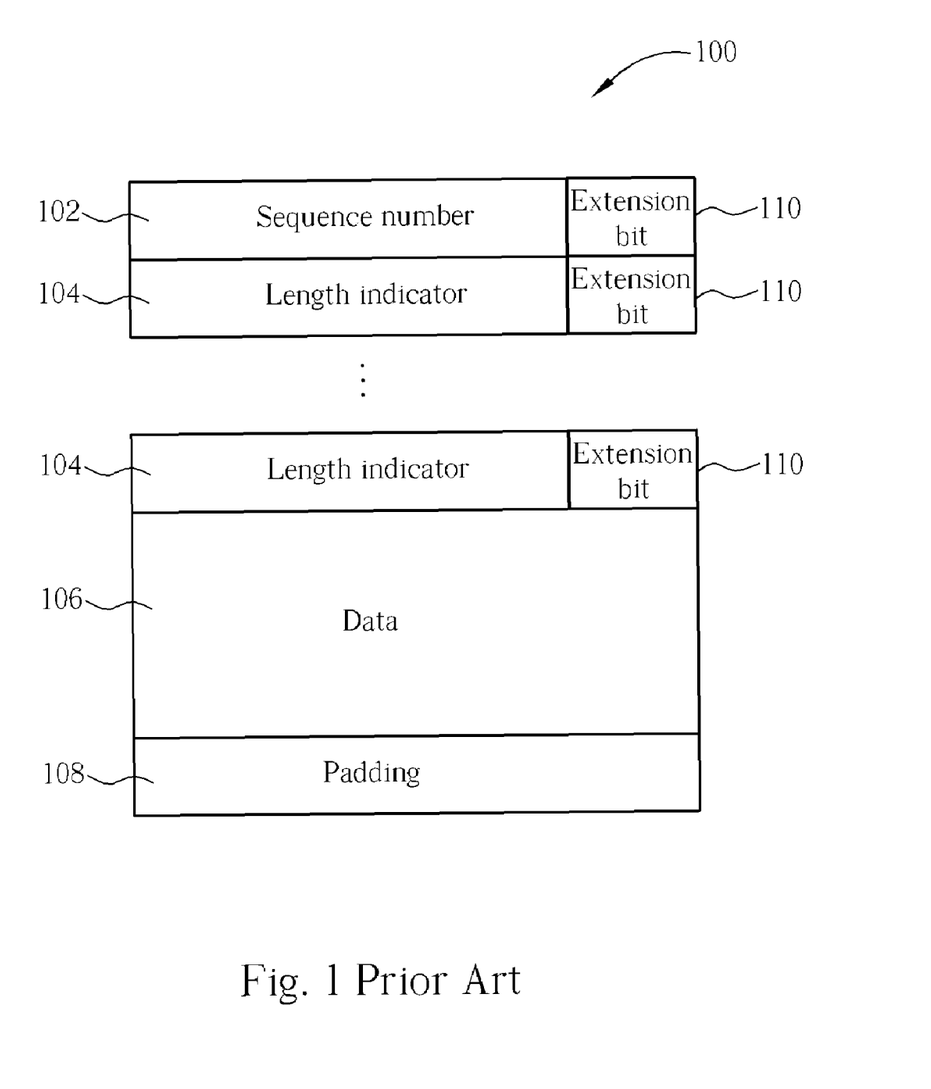
FIG. 1 is a diagram of a Protocol Data Unit (PDU) in UM in the prior art.

Please refer to FIG. 1. FIG. 1 is a diagram of a Protocol Data Unit (PDU) 100 in UM of the prior art. The PDU 100 comprises a sequence number (SN) field 102, a plurality of Length Indicator fields 104, a plurality of fields of extension bits 110, a data field 106 and a padding field 108. In the PDU 100, the sequence number field 102 represents an SN of the PDU 100 and the receiver can reorder received PDUs according to SNs in the sequence number field 102. The length of the extension bit field 110 is 1-bit, which is for storing an extension bit. In the prior art, when the extension bit in the extension bit field 110 is 1, it means that the next field is a Length Indicator field with another extension bit field. On the other hand, when the extension bit is 0, it means that the next field is a data field or a padding field (in AM, it can also be a piggybacked status report unit). The Length Indicator field 104 is used for indicating the ending location of the last octet of a Service Data Unit (SDU) in the PDU 100. The length (or size) of the Length Indicator field 104 can be 7-bit or 15-bit wherein the prior art reserves several preset values to cater to special requirements. In addition, the data field 106 is for storing a plurality of complete SDUs or their segments. The padding field 108 is used for padding unused space of the PDU 100 so that a total length of the PDU 100 agrees with a preset value.

As described earlier, UM is suitable for services that require both instant transmission and packet order, like VoIP communications, Video Phone etc. Taking VoIP services as an example, a good voice communication is continuous and hence closer to a true voice, so that Voice Frame generated (every 20 ms) from voice encoding should be transmitted instantly and continuously to a receiver to maintain voice signal fluency. Thus, for VoIP services, the prior art can map a Voice Frame onto a PDU, so that every PDU comprises a complete SDU (or Voice Frame) that is not segmented, concatenated or padded. For services of fixed data length like this, using the extension bit as described above adds a Length Indicator to each SDU, hence lowers transmission bandwidth efficiency. To increase the bandwidth efficiency for this type of service, the prior art sets the first extension bit of a PDU to be a 1-bit flag, for indicating whether a data field of the PDU comprises a complete SDU that is not segmented, concatenated or padded. To distinguish the flag extension bit from extension bits for other purposes, an Alternate Extension-bit Interpretation variable can be configured in the system to indicate whether the first extension bit of a PDU is used to indicate whether the next field comprises a complete SDU that is not segmented, concatenated or padded. In contrast, when the Alternate Extension-bit Interpretation is not configured or initiated, the first extension-bit field of the PDU is used to indicate whether the next field is a Length Indicator field with another extension bit field, or a data field.

Therefore, when the Alternate Extension-bit Interpretation is configured and if the size of an SDU does not match with the size of the data field in a PDU, a Length Indicator field is needed to indicate the ending location of the SDU. The first extension bit of a PDU is set to indicate that the next field is a Length Indicator field with another extension bit field. In addition, if the size of an SDU is larger than the size of the data field of a PDU, the SDU is segmented. In this situation, in order to keep every transmitting PDU comprising a complete SDU, the transmission efficiency is lowered and system resources are wasted. Please see the descriptions below.

First of all, according to the specification defined by the 3GPP, when the last segment of an SDU exactly ends at an end of a PDU while, in the PDU, no Length Indicator field indicates the ending location of the SDU, the first Length Indicator field of the next PDU is set to 0. Therefore, if the Length Indicator field is 7-bit long, the first Length Indicator field of the next PDU is set to be (000 0000). If the Length Indicator field is 15-bit long, the first Length Indicator field of the next PDU is set to be (000 0000 0000 0000).

Figure 2:
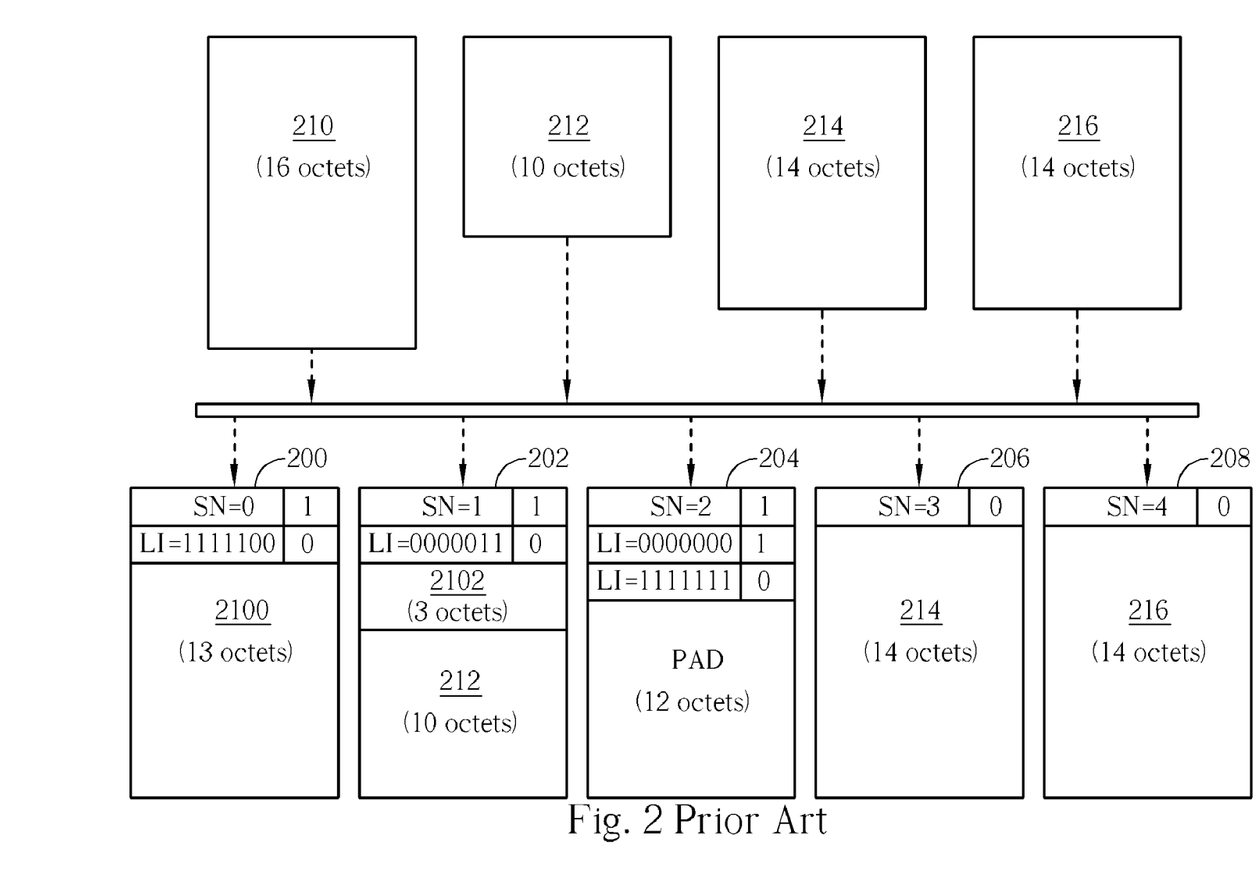
FIG. 2 is a diagram of transmitting a sequence of SDUs when the Alternate Extension-bit Interpretation is configured in UM in the prior art.

Please refer to FIG. 2. FIG. 2 is a diagram of transmitting a sequence of SDUs when the Alternate Extension-bit Interpretation is configured in UM of the prior art. In FIG. 2, the sequence of SDUs comprises SDUs 210, 212, 214, 216, which have sizes of 16, 10, 14, 14 octets respectively. After processes done by sublayers of the RLC entity (transmission buffering, segmenting and concatenating, adding header, encoding etc), PDUs 200, 202, 204, 206, 208 (which have SNs equal to 0, 1, 2, 3, 4 respectively) are output in this sequence. All PDUs 200, 202, 204, 206, 208 have a size of 15 octets, so that when the SDU 210 is divided into partial segments 2100, 2102, their sizes are 13 and 3 octets.

As described earlier, when the Alternate Extension-bit Interpretation is configured, the first extension bit of a PDU is used to indicate whether the next field is a complete SDU that is not segmented, concatenated or padded, or a Length Indicator field with another extension bit field. Therefore, a first extension bit of the PDU 200 is set to 1, after that is a Length Indicator field LI=1111100, which is a specified value for indicating a start of the SDU 210. Similarly, a first extension bit of the PDU 202 is set to 1, after that is a Length Indicator field LI=3, for indicating an ending location of the SDU 210. Please note that, in the PDU 202, the SDU 212 exactly fills a remaining space of the PDU 202, meaning that, the SDU 212 exactly ends at the end of the PDU 202. Since there is no remaining space for another Length Indicator field to indicate an ending location of the SDU 212, the first Length Indicator field of the PDU 204 is set to 0 to indicate this situation. Then, since the SDUs 214, 216 fill data fields of both the PDUs 206, 208. In order to meet requirements of each Transmitting PDU comprising a complete SDU, a second Length Indicator field of the PDU 204 is set to (1111111), which means that the remaining space of the PDU 204 is padding (PAD). In other words, because the SDU 212 ends at the end of the PDU 202, the PDU 204 needs to comprise two Length Indicator fields. One indicates the end of the SDU 212 whereas the other indicates the remaining space to be PAD, so that the requirement of each transmitting PDU comprising a complete SDU is met for PDUs that follows the PDU 204. However, there is no data to be processed (signals output to users) by the receiver in the PDU 204, therefore the PDU 204 causes wasting of system resource and lowering of transmission efficiency.

In summary, since the size of the SDU 210 is larger than the size of data fields of the PDU 200, the SDU 210 is divided into two segments 2100 and 2102. The SDU 212, which follows the last segment 2102 of the SDU 210, exactly fills the data field of the PDU 202 and there is no space remaining in the PDU 202 to contain another Length Indicator field to indicate the ending location of the SDU 212. Thus, the prior art indicates the end of the SDU 212 with the (additional) PDU 204 carrying a Length Indicator field having a value of 0. Since the SDUs 214, 216 following the SDU 212 match (fill) the data fields of PDUs, in order to meet the requirement of each transmitting PDU comprising a complete SDU, the remaining space of the PDU 204 is PAD, which means that there is no 'useful' information in the PDU 204. This means the system resources are wasted and transmission efficiency is lowered.

SUMMARY OF THE INVENTION

A method of data segmentation in a transmitter of a mobile communications system, the method includes initiating alternate extension bit interpretation. When an end of a last data segment of a Service Data Unit exactly ends at an end of a Protocol Data Unit, no Length Indicator in the Protocol Data Unit indicates the end of the Service Data Unit, and a length of a next Service Data Unit following the Service Data Unit is equal to a length of a data field of a next Protocol Data Unit following the Protocol Data Unit, a first extension bit field of the next Protocol Data Unit is set to be a specified value for indicating that a Service Data Unit exactly ended at the end of the Protocol Data Unit.

These and other objectives of the present invention will no doubt become obvious to those of ordinary skill in the art after reading the following detailed description of the preferred embodiment that is illustrated in the various figures and drawings.

DETAILED DESCRIPTION

To improve over problems in the prior art, the present invention provides a method and apparatus for data segmentation in a mobile communications system, which avoids system resource wasting and improves transmission efficiency. The mobile communications system is better practiced in UM of a $3^{rd}$ generation mobile communications system, where an Alternate Extension-bit Interpretation can be configured to indicate whether the first extension bit of a PDU is used to indicate the data field of the PDU comprising a complete SDU that is not segmented, concatenated or padded.

Figure 7:
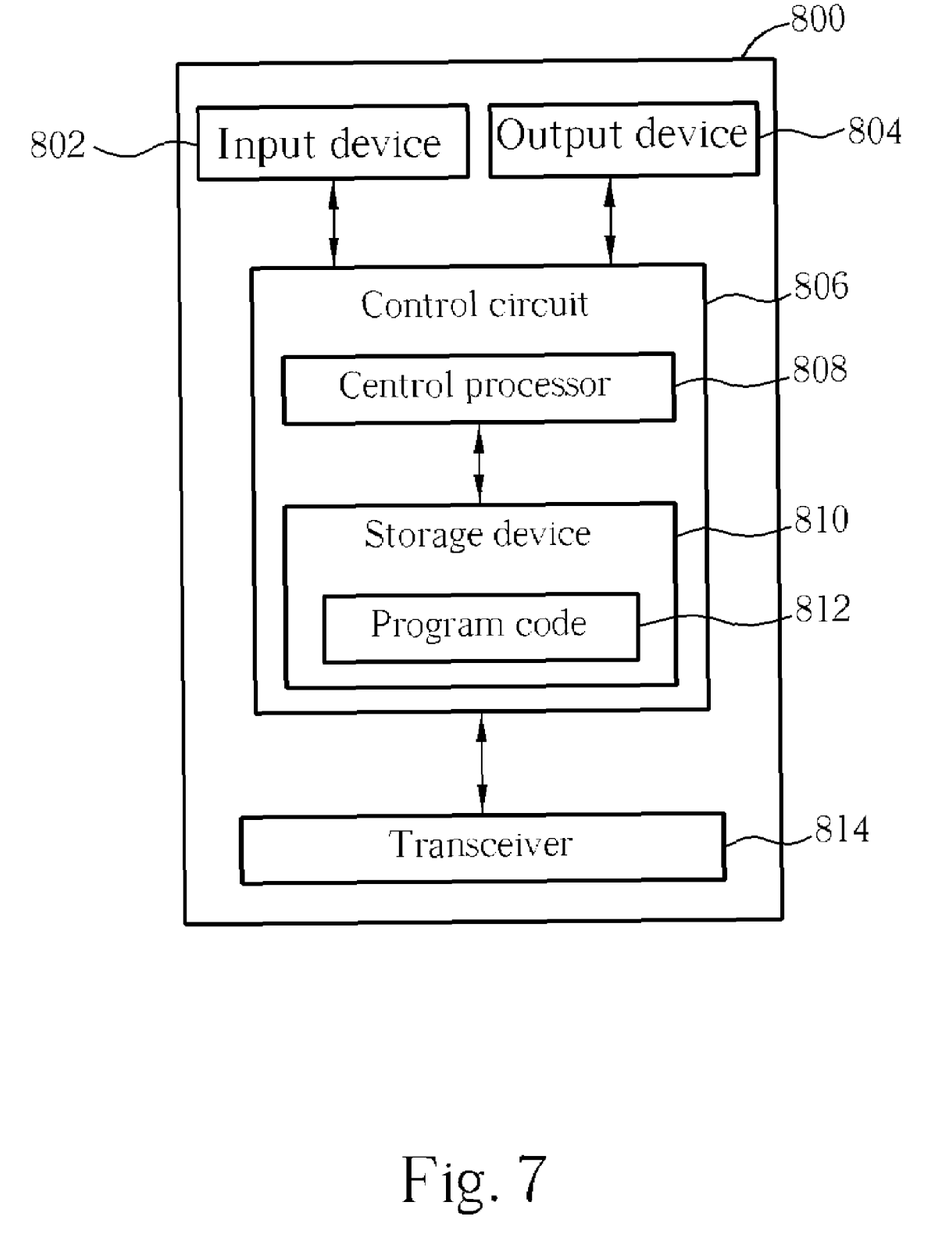
FIG. 7 is a functional block diagram of a mobile communications system.

Please refer to FIG. 7. FIG. 7 is a functional block diagram of a mobile communications system 800. For simplicity, FIG. 7 only shows an input device 802, an output device 804, a control circuit 806, a central processor 808, a storage device 810, a program code 812, and a transceiver 814 of the mobile communications device 800. In the mobile communications device 800, the control circuit 806 executes the program code 812 stored in the storage device 810 with the central processor 808, and then controls operations of the mobile communications device 800. The mobile communications device 800 can receive signals inputted by users through the input device 802, or output signals like images, sounds etc. through the output device 804 (such as monitor, speaker etc.). The transceiver 814 is used for receiving radio signals and delivering received radio signals to the control circuit 806 or transmitting signals submitted from the control circuit 806 in a radio manner. In a structure of a communications protocol, the transceiver 814 is known as a part of Layer one, whereas the control circuit 806 is an application of Layer two and Layer three.

Figure 8:
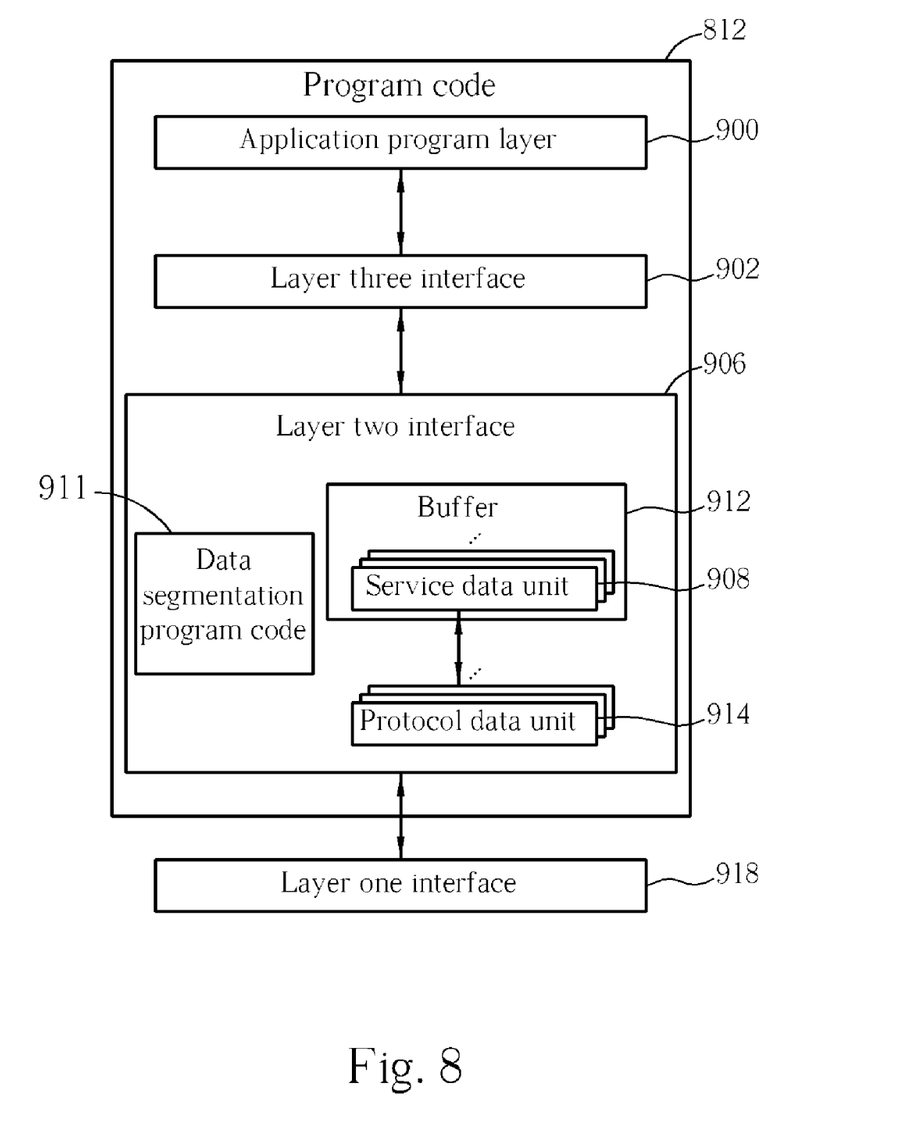
FIG. 8 is a diagram of the program code in FIG. 7.

Please refer to FIG. 8. FIG. 8 is a schematic diagram of the program code 812 in FIG. 7. The program code 812 comprises an application program layer 900, a Layer three interface 902, a Layer two interface 906, and a Layer one interface 918. When transmitting signals, the Layer two interface 906 stores a plurality of Service Data Units (SDUs) 908 submitted from the Layer three interface 902 in a buffer 912. Then, the Layer two interface 906 generates a plurality of PDUs 914 according to the SDUs 908 stored in the buffer 912 and outputs the generated PDUs 914 to a destination through the Layer one interface 918. In reverse, when receiving a radio signal, the signal is received through the Layer one interface 918 and the Layer one interface 918 delivers PDUs 914 to the Layer two interface 906. The Layer two interface 906 reassembles the PDUs 914 to SDUs 908 and stores the SDUs 908 in the buffer 912. At last, the Layer two interface 906 delivers the SDUs 908 stored in the buffer 912 to the Layer three interface 902.

When operating in UM, for effectively segmenting data, the Layer two interface 906 of the program code 812 further comprises a data segmentation program code 911 for increasing transmission efficiency.

Figure 3:
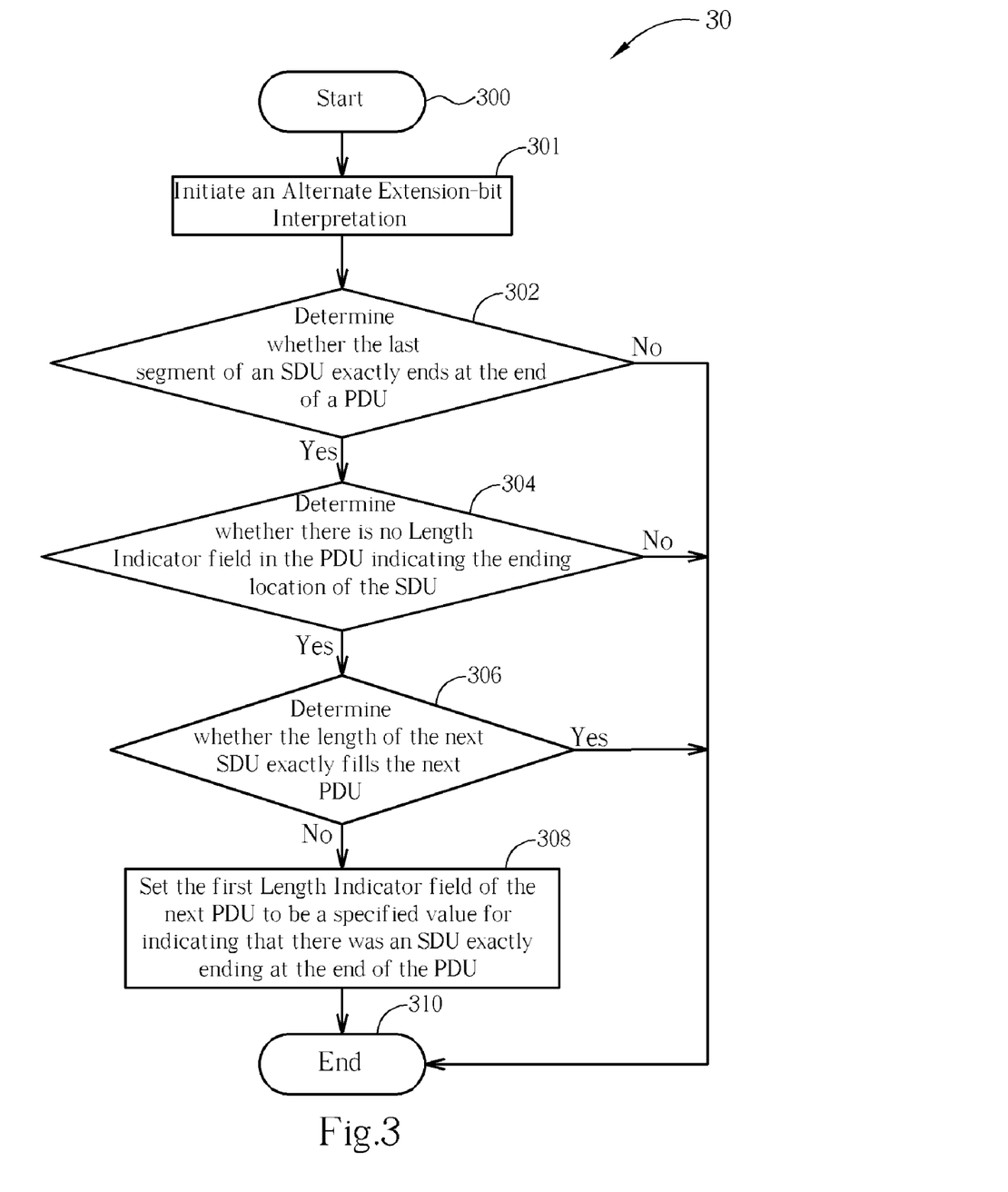
FIG. 3 is a flow chart of a first embodiment for data segmentation in a mobile communications system according to the present invention.

Please refer to FIG. 3. FIG. 3 is a flow chart of a procedure 30 of a first embodiment for data segmentation in a mobile communications system of the present invention. The procedure 30 can be compiled into the data segmentation program code 911 and comprises the following steps.

Step 300: start.

Step 301: initiate an Alternate Extension-bit Interpretation.

Step 302: determine whether the last segment of an SDU ends exactly at the end of a PDU. If so, go to step 304. If not, go to step 310.

Step 304: determine whether there is no Length Indicator field in the PDU indicating the ending location of the SDU. If none exists, go to step 306. If one is found, go to step 310.

Step 306: determine whether the length of the next SDU exactly fills the next PDU. If not, go to step 308. If the length of the next SDU exactly fills the next PDU, go to step 310.

Step 308: set a value of the first Length Indicator field of the next PDU to be a specified value for indicating that there was an SDU exactly ending at the end of the PDU.

Step 310: end.

According to the procedure 30, after initiating the Alternate Extension-bit Interpretation, a situation may exist where the end of an SDU coincides with the end of a PDU and the PDU has no Length Indicator field for indicating the ending location of the end of the SDU, and the length of the next SDU does not exactly fill the next PDU, meaning that the first extension bit of the next PDU following the PDU is 1. In other words, the first extension bit of the next PDU is not used to indicate the next PDU comprises a complete SDU that is not segmented, concatenated or padded. In this situation, the Length Indicator field is set to a specified value to indicate that there is an SDU exactly ending at the end of the PDU. In contrast, if the first extension bit is used to indicate that the next PDU comprises a complete SDU, which is not segmented, concatenated or padded, then the present invention provides another embodiment.

Figure 4:
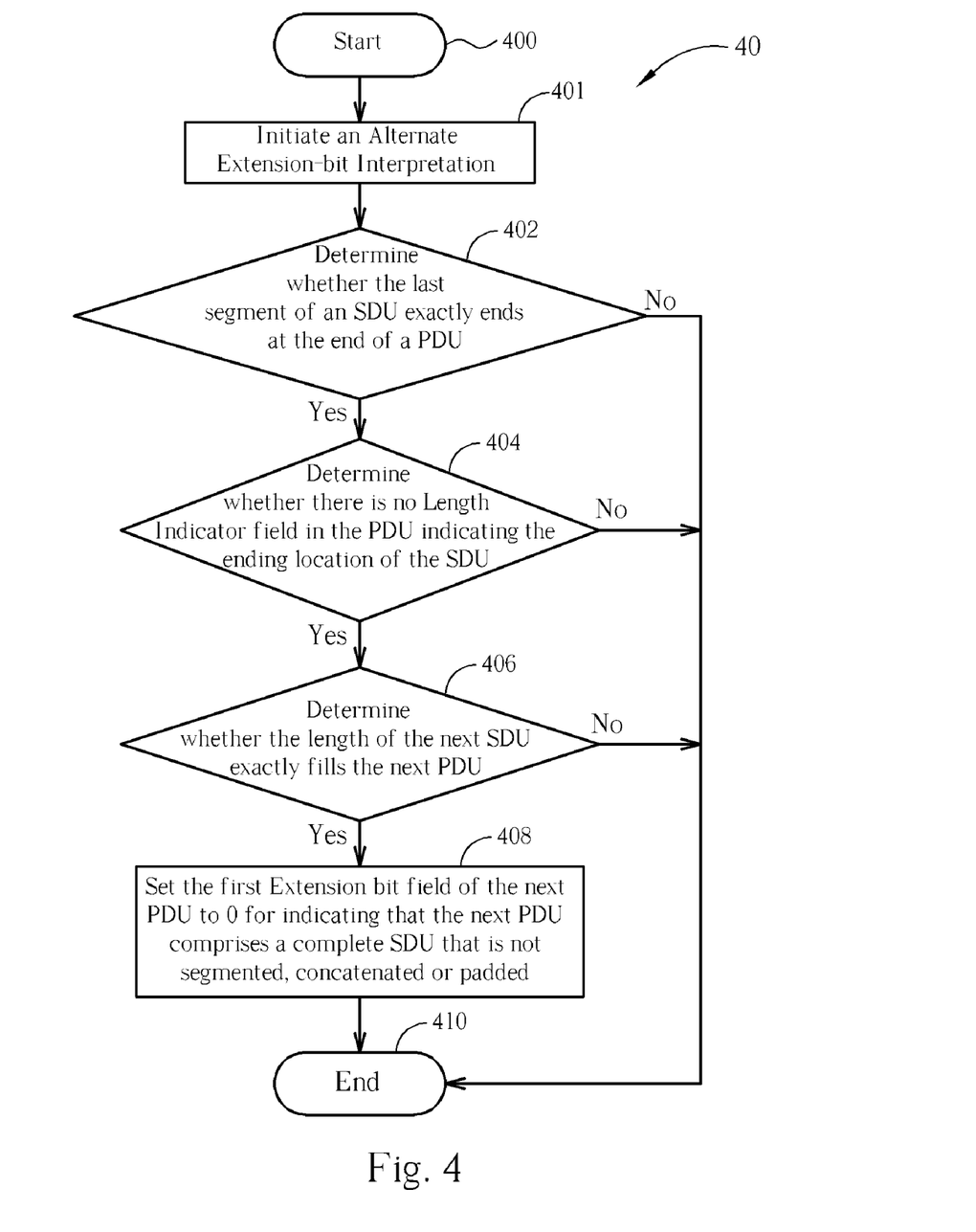
FIG. 4 is a flow chart of a second embodiment for data segmentation in a mobile communications system according to the present invention.

Please refer to FIG. 4. FIG. 4 is a flow chart of a procedure 40 of a second embodiment for data segmentation in a mobile communications system of the present invention. The procedure 40 can be compiled into the data segmentation program code 911 and comprises the following steps:

Step 400: start.

Step 401: initiate an Alternate Extension-bit Interpretation.

Step 402: determine whether the last segment of an SDU exactly ends at the end of a PDU. If so, go to step 404. If not, go to step 410.

Step 404: determine whether there is no Length Indicator field in the PDU indicating the ending location of the SDU. If none exists, go to step 406. Else, go to step 410.

Step 406: determine whether the length of the next SDU exactly fills the next PDU. If yes, go to step 408. Else, go to step 410.

Step 408: set the first Extension bit field of the next PDU to 0 for indicating that the next PDU comprises a complete SDU that is not segmented, concatenated or padded.

Step 410: end.

According to the procedure 40, after initiating the Alternate Extension-bit Interpretation, when an SDU exactly ends at the end of a PDU, the PDU has no Length Indicator field for indicating the ending location of the end of the SDU, and the length of the next SDU exactly fills the next PDU, then set the first extension bit of the next PDU following the PDU to 0 to indicate that the next PDU comprises a complete SDU that is not segmented, concatenated or padded. This means that the next PDU does not need to comprise any Length Indicator field to indicate that the SDU exactly ends at the end of the PDU. In other words, when the Alternate Extension-bit Interpretation is configured, if the first extension bit of a PDU equals 0, the PDU comprises a complete SDU, which is not segmented, concatenated or padded. In addition, it also means that in a PDU previous to the PDU, an SDU exactly ended at the end of the previous PDU where the end of the SDU has not been indicated with a Length Indicator.

Figure 5:
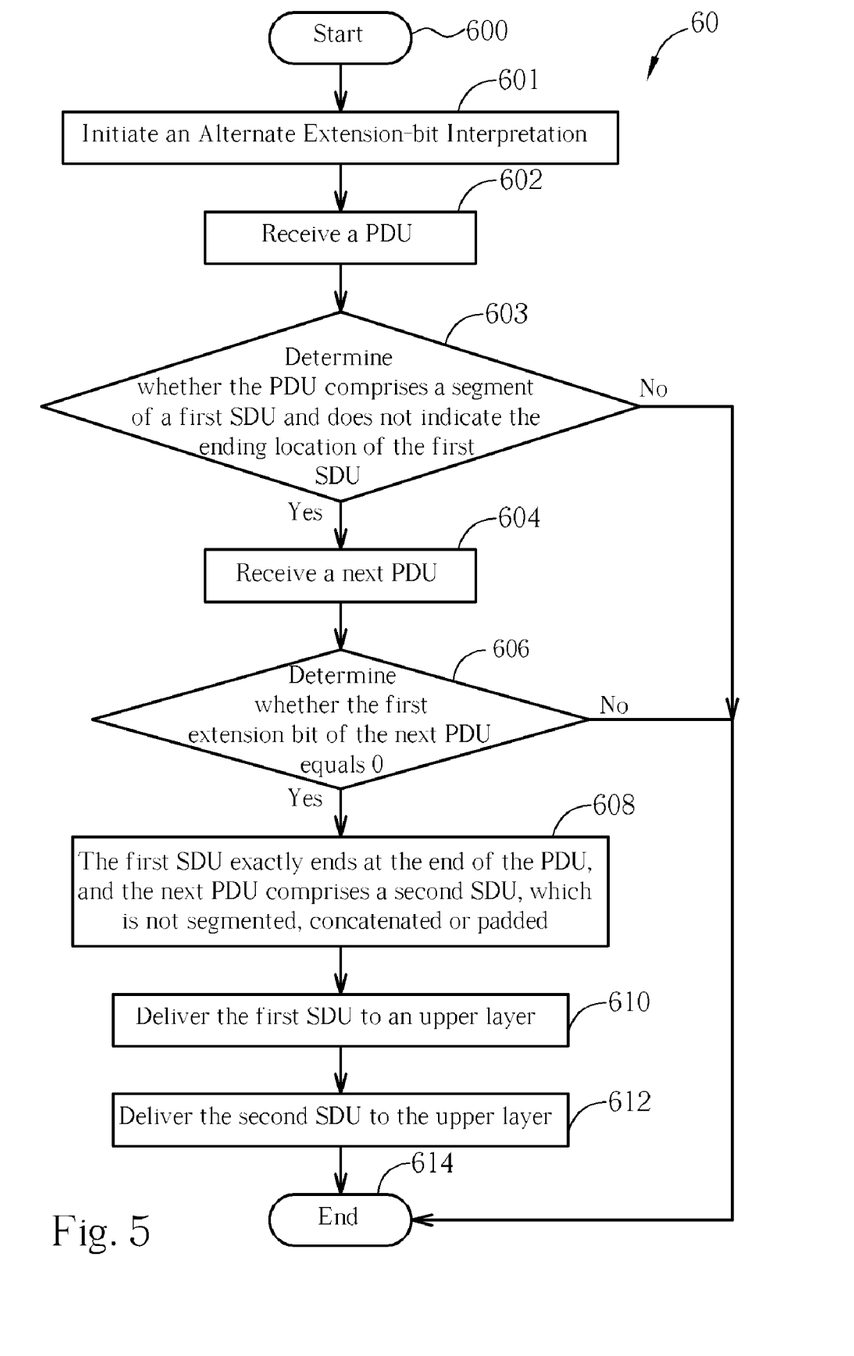
FIG. 5 is a flow chart of a third embodiment for data segmentation in a mobile communications system according to the present invention.

Please refer to FIG. 5. FIG. 5 is a flow chart of a procedure 60 of a third embodiment for data segmentation in a mobile communications system of the present invention. The procedure 60 can be compiled into the data segmentation program code 911, and comprises the following steps:

Step 600: start.

Step 601: initiate an Alternate Extension-bit Interpretation.

Step 602: receive a PDU.

Step 603: determine whether the PDU comprises a segment of a first SDU and does not indicate the ending location of the first SDU. If so, go to step 604. If not, go to step 614.

Step 604: receive a next PDU.

Step 606: determine whether the first extension bit of the next PDU equals 0. If so, go to step 608. If not, go to step 614.

Step 608: the first SDU exactly ends at the end of the PDU, and the next PDU comprises a second SDU, which is not segmented, concatenated or padded.

Step 610: deliver the first SDU to an upper layer.

Step 612: deliver the second SDU to the upper layer.

Step 614: end.

According to the procedure 60, when the Alternate Extension-bit Interpretation is configured and initiated, if the first extension bit of a received PDU in a receiver equals 0, this means that the PDU comprises a complete first SDU that is not segmented, concatenated or padded and when a PDU previous to this PDU comprises a segment of a second SDU and does not indicates its ending location, this also means that the second SDU exactly ended at the end of the previous PDU. The receiver then delivers the second SDU and the first SDU to an upper layer in sequence.

Therefore, in the present invention, as the Alternate Extension-bit Interpretation is configured and initiated, if a transmitter determines a first SDU exactly ends at an end of a PDU, and a PDU subsequent to the PDU comprises a complete second SDU that is not segmented, concatenated or padded, then the first extension bit of the subsequent PDU is set to 0, and there is no need to transmit a Length Indicator to indicate the ending location of the first SDU. Correspondingly, if the first extension bit of a PDU received by a receiver is 0, then the PDU comprising a complete SDU, which is not segmented, concatenated or padded, is determined. In addition, if a PDU previous to the PDU comprises a segment of an SDU, whose ending location is not indicated, then the SDU exactly ending at the end of the previous PDU can be determined without a Length Indicator field. In this way, system resource wasting is avoided and hence the transmission efficiency is increased.

Figure 6:
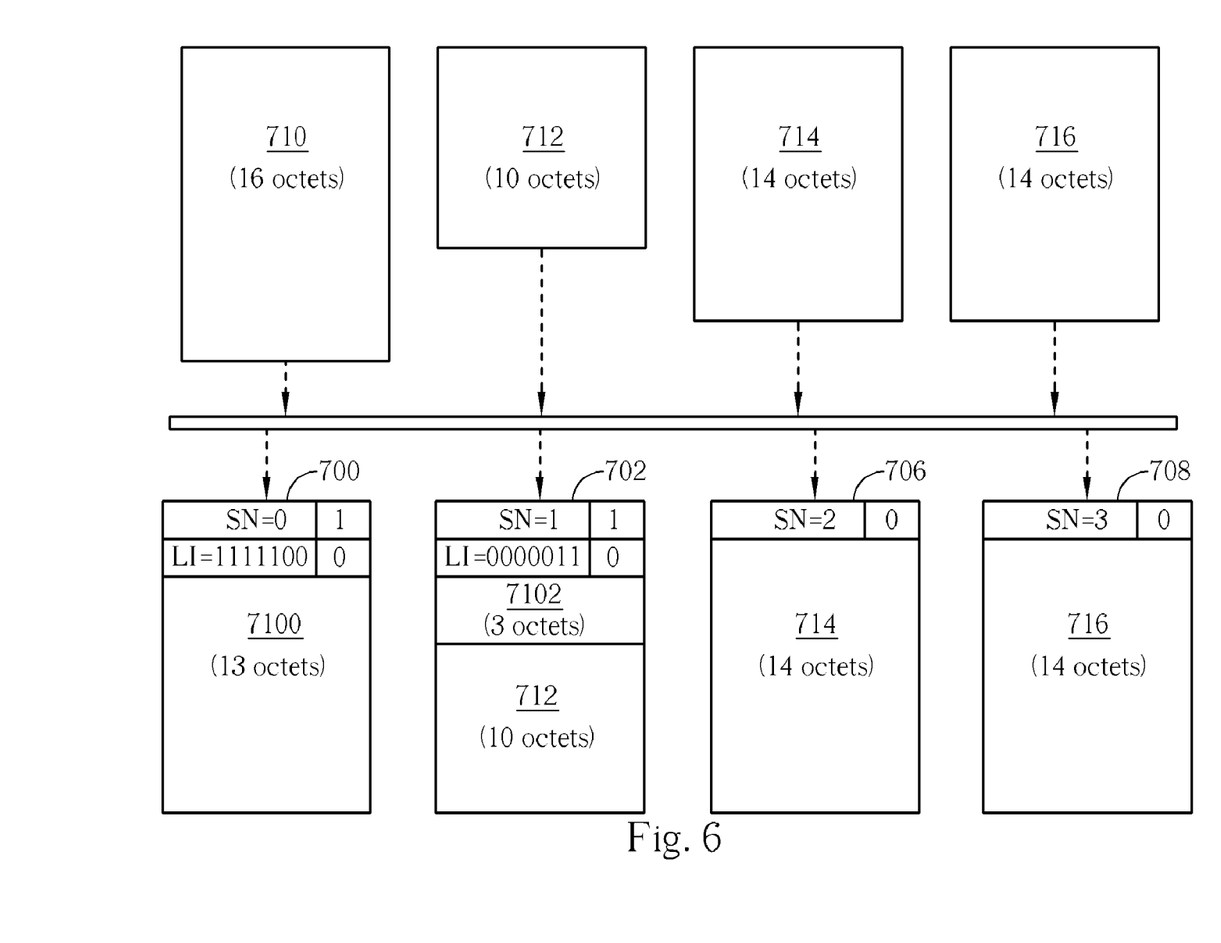
FIG. 6 is a diagram of transmitting a sequence of SDUs when the Alternate Extension-bit Interpretation is configured in UM according to the present invention.

Please refer to FIG. 6 as an example. FIG. 6 is a diagram of transmitting a sequence of SDUs when the Alternate Extension-bit Interpretation is configured in UM of the present invention. In FIG. 6, the sequence of SDUs comprises SDUs 710, 712, 714, 716, which have sizes of 16, 10, 14, 14 octets respectively. After processes done by each sublayer of the RLC entity (transmission buffering, segmenting and concatenating, adding header, encoding etc), PDUs 700, 702, 706, 708 (which have SNs equal to 0, 1, 2, 3 respectively) are submitted to lower layer in this sequence. All PDUs 700, 702, 706, 708 have a size of 15 octet, so that when the SDU 710 is divided into segments 7100, 7102, their sizes are 13 and 3 octets respectively. From FIG. 6, the SDU 712, being concatenated with the segment 7102, fills exactly the remaining space of the PDU 702, which means that the SDU 712 exactly ends at an end of the PDU 702. At the same time, the SDU 714 also exactly fills in data fields of the PDU 706, meaning that the SDU 714, which is carried by the data fields in the PDU 706, is a complete SDU that is not segmented, concatenated and padded. Therefore, in the present invention, the first extension bit of the PDU 706 is set to 0. In other words, when the first extension bit of the PDU 706 is set to 0, this means the SDU 712 exactly ends at the end of the PDU 702, thus the PDU 706 does not need a Length Indicator field to indicate that the SDU 712 ends at the end of the PDU 702, resulting in a saved PDU and increased transmission efficiency.

In short, since the size of the SDU 710 is larger than the size of data fields of the PDU 700, the SDU 710 is divided into two segments 7100 and 7102. The SDU 712, which concatenates the last segment 7102 of the SDU 710, exactly fills the data fields of the PDU 702 and the SDU 714 following the SDU 712 matches (fills exactly) with the data fields of the PDU. The present invention sets the first extension bit of the PDU 706, which carries the SDU 714, to 0, meaning that the SDU 712 ends at the end of the PDU 702 and the PDU 706 comprises a complete SDU 714. In this way, every PDU comprises 'useful' information, hence saving system resource and increasing transmission efficiency. In comparison, the prior art needs to add an extra PDU to contain a Length Indicator field to indicate that the SDU 712 ends at the end of the PDU 702 and the remaining space of the extra PDU is padded to meet the requirement of every transmitting PDU comprising a complete SDU.

Thus, the present invention, as the Alternate Extension-bit Interpretation is configured and initiated, defines that when the first extension bit of a PDU equals 0, the PDU comprises a complete SDU, which is not segmented, concatenated or padded, and, in addition, if a PDU previous to the PDU comprises an SDU without indicating its ending location, then the SDU exactly ends at the end of the previous PDU. On the other hand, if the first extension bit of the PDU is 1, it represents that the next field is a Length Indicator field with another extension bit field. In summary, when the Alternate Extension-bit Interpretation is configured and initiated, the present invention can accommodate the requirement of every transmitting PDU comprising a complete SDU that is not segmented, concatenated or padded to the greatest extent. In addition, if a previous PDU of the PDU comprises an SDU without indicating its ending location, the present invention can represent the situation without an extra PDU. Therefore the present invention can save PDUs, increase transmission efficiency, and avoid system resource wasting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of data segmentation in a transmitter of a mobile communications system, the method comprising:
    initiating alternate extension bit interpretation;
    a last data segment of a first Service Data Unit exactly ending at an end of a first Protocol Data Unit;
    no Length Indicator in the first Protocol Data Unit indicating the end of the first Service Data Unit;
    a length of a second Service Data Unit following the first Service Data Unit exactly equaling to a length of a data field of a second Protocol Data Unit following the Protocol Data Unit; and
    setting a first extension bit of the second Protocol Data Unit to be a specified value for indicating that the second Protocol Data Unit comprises a complete Service Data Unit, which is not segmented, concatenated or padded, and indicating that a Service Data Unit exactly ended in the first Protocol Data Unit.

2. The method of claim 1 wherein the specified value is 0.

3. The method of claim 1 wherein the mobile communications system is operating in Unacknowledged Mode.

4. A mobile communications device comprising a central processing unit in electrical communications with a memory, the memory comprising program code for implementing the method of claim 1.

5. A method of data segmentation in a receiver of a mobile communications system, the method comprising:
    initiating alternate extension bit interpretation;
    receiving a first Protocol Data Unit;
    the first Protocol Data Unit comprising a data segment of a first Service Data Unit but not an ending location of the first Service Data Unit;
    receiving a second Protocol Data Unit;
    the second Protocol Data Unit being a next Protocol Data Unit following the first Protocol Data Unit;
    determining that the first Service Data Unit ends at an end of the first Protocol Data Unit and the second Protocol Data Unit comprises a complete second Service Data Unit that is not segmented, concatenated or padded, when a value of a first extension bit of the second Protocol Data Unit equals to a first value;
    delivering the first Service Data Unit to an upper layer; and
    delivering the second Service Data Unit to the upper layer.

6. The method of claim 5 wherein the second Protocol Data Unit does not comprise a Length Indicator field for indicating an end of the first Service Data Unit.

7. The method of claim 5 wherein the first value is 0.

8. The method of claim 5 wherein the mobile communications system is operating in Unacknowledged Mode.

9. A mobile communications device comprising a central processing unit in electrical communications with a memory, the memory comprising program code for implementing the method of claim 5.

* * * * *

UNITED STATES PATENT AND TRADEMARK OFFICE
CERTIFICATE OF CORRECTION

| | | |
|---|---|---|
| PATENT NO. | : 7,646,791 B2 | Page 1 of 1 |
| APPLICATION NO. | : 11/383759 | |
| DATED | : January 12, 2010 | |
| INVENTOR(S) | : Sam Shiaw-Shiang Jiang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 737 days.

Signed and Sealed this

Sixteenth Day of November, 2010

David J. Kappos
*Director of the United States Patent and Trademark Office*